June 24, 1924.

J. G. GONNELLA

BUTTER CUTTER

Filed Nov. 28, 1922

1,498,792

Inventor
John G. Gonnella
By H.L. & L.L. Reynolds
Attorneys

Patented June 24, 1924.

1,498,792

UNITED STATES PATENT OFFICE.

JOHN G. GONNELLA, OF SEATTLE, WASHINGTON.

BUTTER CUTTER.

Application filed November 28, 1922. Serial No. 603,749.

*To all whom it may concern:*

Be it known that I, JOHN G. GONNELLA, a citizen of the United States of America, and resident of the city of Seattle, in the county of King and State of Washington, have invented certain new and useful Improvements in Butter Cutters, of which the following is a specification.

My invention relates to butter cutters of the type intended for cutting a butter cube into equal parts.

A grocer is often called upon to sell a half pound of butter, and to do so must cut the cube of butter, which is in reality an elongated brick, into two equal parts.

It is the principal object of my invention to provide in a single instrument means for centering the butter cube relative to a knife, and of providing means for receiving and holding the knife in such way that it is protected and yet available for instant use, and which will guide the knife so that it will accurately divide the butter cube into equal parts.

A further object is the provision in such a butter cutter of improved and simplified centering means.

A further object is the provision of means for receiving and holding the knife which will keep it enclosed and sanitary and yet permit its easy removal for cleaning when necessary.

My invention comprises those novel parts and combinations thereof which are shown in the accompanying drawings, described in the specification and particularly defined by the claims terminating the same.

In the accompanying drawings I have shown my invention in the form which is now preferred by me.

A table 1 is provided upon which the butter cube is placed, this table being supported by a suitable base or stand 10. Preferably adjacent one edge of the table the base 10 is raised to form a shoulder or flange 11 against which one side edge of the butter cube is placed to more accurately position it. I have shown this shoulder 11 cut away at 17 to enable the operator to more easily grasp the halves after cutting them.

Figure 1:
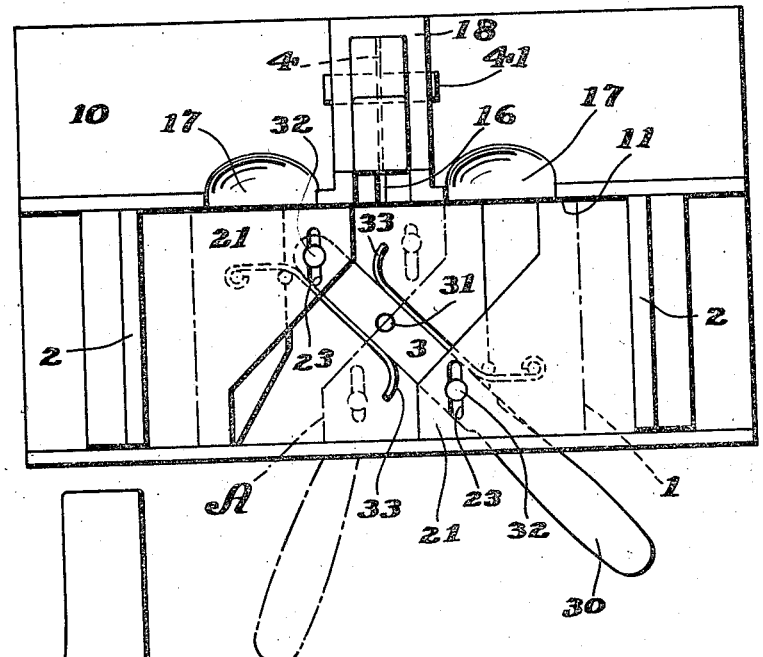
Figure 1 is a plan view of my invention with the butter receiving table removed.
Figure 2:
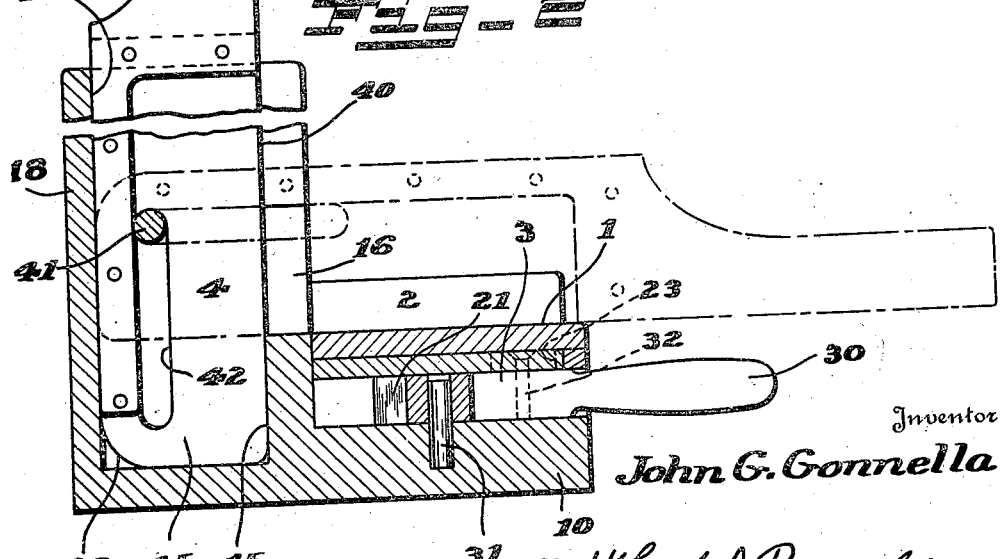
Figure 2 is a central transverse section through my device.

To center the cube upon the table I provide two slides 2. These are slidable in the base 10 outside of the ends of the table 1, to engage the end edges of the butter cube. They are each provided with extensions 21, which preferably extend beneath the table 1. The extensions 21 project each toward the opposite slide, and are disposed upon opposite sides so that they may pass, as is best indicated in Figure 1, where the dot-and-dash line A represents the two adjacent edges of the extensions 21 as abutting.

An operating lever 3, provided with a handle 30, is centrally pivoted at 31 in the base 10. In it are secured pins 32 one in each end, these pins engaging in transversely extending slots 23 in the extensions 21. By this means the operating lever 3 is directly connected to each of the slides 2, and by swinging it to the left, from the position shown in Figure 1, the slides 2 are caused to approach each other to center the butter cube. Springs 33 are provided, these being shown as engaging the lever 3, their purpose being to return the slides 2 to their normal spread-apart position.

The base 10 is provided with a sheath 18 having an upwardly opening pocket 14 at one side of the table 1 and centrally positioned relative to its length, if it is desired to cut the butter cube into halves. A portion 15 of this pocket extends below the level of the table. A slot 16 is provided in that side of the pocket 14 which faces toward the table 1, this slot extending only down to the level of the table.

The sheath 18, with its pocket 14 and downward extension 15, holds and guides a knife 4. The knife has its lower end 45 adapted to be received in the pocket extension 15 and when so received the knife extends vertically upward. Means are provided, however, for permitting swinging of the knife after it has been raised to such an extent that its cutting edge 40 will be level with the table 1 when swung into horizontal position. These means I have shown as comprising a pivot pin 41 extending transversely across the pocket 14, above the level of the table, and passing through a longitudinally extending slot 42 in the knife. The slot 42 terminates short of the extreme end of the knife, and the outer lower corner 43 of the end 45 of the knife is cut upon a curve which is concentric with the adjacent end of the slot 42.

By raising the knife vertically upward the lower end of the slot 42 forms with the pin 41 a pivot bearing upon which the knife may swing, the curved corner permitting this swinging. By swinging the knife through the knife slot 16, after having been raised, it is brought down and across a cube of butter placed on the table 1. It is then replaced in its sheath by swinging it upward and then dropping it, so that its lower end 45 is received in the pocket extension 15. In this manner the knife is supported in a vertical position and is enclosed within its sheath. It is always in position for use and is accurately positioned relative to the centering means or slides 2.

What I claim as my invention is:

1. In a butter cutter, a table for the reception of the butter to be cut, a knife, a knife-blade-holding socket located without the table and centrally of its length and adapted to receive and hold the knife in vertical position and having a slot at the edge corresponding with the edge of the knife, a guide and pivot comprising a pin in one member and a slot in the other connecting the knife and socket to permit vertical movement of the knife to raise it and to then permit swinging it downward.

2. In a butter cutter, a butter holding table, a knife blade-holding and protecting socket without and extending below the table and a knife-receiving slot above the table level, said socket being adapted to enclose and retain the knife blade when vertically placed, the knife blade having a longitudinally extending slot extending close to its end and a pivot pin carried by the socket and passing through the slot in the blade, said pin being positioned above the table level to permit the knife to swing down upon the table when the pin is at the outer end of the slot in the blade and to occupy the other end of the slot when the blade is at the bottom of the socket to thereby maintain the knife in vertical position.

3. A butter cutter comprising a table for reception of the butter to be cut, a knife, a vertically extending pocket for the knife located without and at one side of the butter-receiving table, a pin extending across said pocket well above the table level, the knife having a longitudinally extending slot for the reception of the said pin extending to near its end, whereby the knife may be dropped into said pocket after it has been swung into vertical position and be thereby held in vertical position.

4. In a butter cutter, in combination with a table, a knife for cutting an article upon said table, a sheath therefor comprising a vertically extending pocket extending below the table and having a knife slot in its side facing the table and extending only from the table's level upwardly, a pivot pin extending across said pocket above the table's level, said knife having a longitudinally extending slot receiving said pivot pin, and permitting raising of the knife out of the unslotted lower end of the pocket and then swinging downward.

5. In a butter cutter, in combination with a butter-supporting table, a knife positioned between the ends of said table and normally extending vertically with its edge towards the table, a knife guide against which the back edge of the knife normally lies, a slot in the knife parallel to the knife's back edge, and a fixed pivot pin received in said slot and positioned above the table, the upper end of said slot being farther removed from the lower end of the knife than the distance from the slot to said knife guide, whereby the knife is held vertical until raised, and the lower end of said slot being not farther removed from its end than the distance from the slot to the knife guide, whereby the knife may be swung downward when raised.

6. In a butter cutter, in combination with a butter-supporting table, a knife positioned between the ends of said table and normally extending vertically with its edge towards the table, a stop engaging the lower end of the knife and its support having cooperating means permitting vertical movement and swinging of the knife about a horizontal pivot axis, said stop being positioned above the lower end of the knife, when in its normal lowermost vertical position, whereby the knife cannot be swung downward prior to raising it.

Signed at Seattle, King County, Washington, this 22nd day of November, 1922.

JOHN G. GONNELLA.